United States Patent
Singh

(10) Patent No.: US 8,098,811 B2
(45) Date of Patent: Jan. 17, 2012

(54) METHODS AND SYSTEMS FOR SELECTIVELY PLAYING RECEIVED RINGTONES

(75) Inventor: Mona Singh, Cary, NC (US)

(73) Assignee: Scenera Technologies, LLC, Portsmouth, NH (US)

( * ) Notice: Subject to any disclaimer, the term of this patent is extended or adjusted under 35 U.S.C. 154(b) by 1405 days.

(21) Appl. No.: 11/609,999

(22) Filed: Dec. 13, 2006

(65) Prior Publication Data

US 2008/0144795 A1 Jun. 19, 2008

(51) Int. Cl.
*H04M 3/42* (2006.01)
*H04B 1/38* (2006.01)

(52) U.S. Cl. ............ 379/373.02; 84/609; 235/380; 370/352; 379/88.17; 379/88.21; 379/207.16; 379/373.01; 379/418; 455/414.4; 455/412.2; 455/418; 455/550.1; 455/567; 715/864

(58) Field of Classification Search .......... 235/380; 379/88.17, 207.16, 373.01, 373.02, 373.03, 379/88.21, 374.01, 418; 455/418, 567, 550.1, 455/412.2, 414.4; 715/864; 370/352; 84/609
See application file for complete search history.

(56) References Cited

U.S. PATENT DOCUMENTS

| | | | |
|---|---|---|---|
| 5,960,367 A * | 9/1999 | Kita ........................ | 455/567 |
| 6,018,654 A * | 1/2000 | Valentine et al. .......... | 455/414.4 |
| 6,330,457 B1 | 12/2001 | Yoon | |
| 6,366,791 B1 * | 4/2002 | Lin et al. ................... | 455/567 |
| 6,418,330 B1 * | 7/2002 | Lee ............................ | 455/567 |
| 6,771,639 B1 * | 8/2004 | Holden ...................... | 370/352 |
| 6,778,648 B1 | 8/2004 | Alston et al. | |
| 6,813,491 B1 | 11/2004 | McKinney | |
| 7,197,135 B1 * | 3/2007 | Silver et al. ............... | 379/373.02 |
| 7,302,253 B2 * | 11/2007 | Moody et al. .............. | 455/412.2 |
| 7,343,150 B2 * | 3/2008 | Seligmann et al. ........ | 455/412.2 |
| 7,356,132 B1 * | 4/2008 | Silver et al. ............... | 379/88.21 |
| 7,369,845 B2 * | 5/2008 | Keohane et al. ........... | 455/418 |
| 7,379,760 B2 * | 5/2008 | Ishii .......................... | 455/567 |
| 7,451,921 B2 * | 11/2008 | Dowling et al. ........... | 235/380 |
| 7,486,971 B2 * | 2/2009 | Awada et al. .............. | 455/567 |
| 7,519,166 B1 * | 4/2009 | Silver et al. ............... | 379/88.21 |
| 7,526,309 B2 * | 4/2009 | Kronlund et al. .......... | 455/550.1 |
| 7,586,031 B1 * | 9/2009 | Baker ........................ | 84/609 |
| 7,599,482 B2 * | 10/2009 | Silver et al. ............... | 379/373.02 |
| 7,616,741 B2 * | 11/2009 | Reynolds et al. .......... | 379/88.17 |
| 7,729,487 B2 * | 6/2010 | Koch ......................... | 379/207.16 |
| 7,738,651 B2 * | 6/2010 | Miller ........................ | 379/373.03 |
| 7,761,816 B2 * | 7/2010 | Goldfarb et al. .......... | 715/864 |
| 7,844,047 B1 * | 11/2010 | Silver et al. ............... | 379/374.01 |
| 2003/0017860 A1 * | 1/2003 | Choi .......................... | 455/567 |
| 2004/0066932 A1 * | 4/2004 | Seligmann ................. | 379/373.01 |
| 2004/0076285 A1 * | 4/2004 | Mahadevaiah ............ | 379/373.01 |
| 2004/0223605 A1 | 11/2004 | Donnelly | |
| 2005/0058268 A1 | 3/2005 | Koch | |
| 2005/0143103 A1 | 6/2005 | Bjorgan et al. | |
| 2005/0175161 A1 * | 8/2005 | Reynolds et al. .......... | 379/88.17 |
| 2005/0207556 A1 | 9/2005 | Gonzalez et al. | |
| 2006/0111085 A1 | 5/2006 | Lee | |
| 2006/0270421 A1 | 11/2006 | Phillips et al. | |
| 2006/0281484 A1 * | 12/2006 | Kronlund et al. .......... | 455/550.1 |

(Continued)

*Primary Examiner* — Gerald Gauthier

(57) ABSTRACT

Methods and systems are described for selectively playing received ringtones. Receipt at a communication device of an incoming voice call that includes a ringtone is detected. A ringtone preselected for the communication device is played in response to receiving the incoming call. Prior to receiving input for answering the call at the communication device, user input for one of playing and not playing the received ringtone at the communication device is received. The received ringtone is played or not played based on the received user input.

22 Claims, 2 Drawing Sheets

U.S. PATENT DOCUMENTS

| | | | |
|---|---|---|---|
| 2007/0127707 A1* | 6/2007 | Koser et al. | 379/373.03 |
| 2008/0095333 A1* | 4/2008 | Tudor | 379/88.17 |
| 2008/0144795 A1* | 6/2008 | Singh | 379/207.16 |
| 2008/0170683 A1* | 7/2008 | Zernovizky et al. | 379/418 |
| 2008/0318638 A1* | 12/2008 | Jonsson et al. | 455/567 |
| 2009/0163251 A1* | 6/2009 | Decugis | 455/567 |
| 2009/0304171 A1* | 12/2009 | Pearson et al. | 379/207.16 |
| 2010/0020957 A1* | 1/2010 | Reynolds et al. | 379/207.16 |

* cited by examiner

METHODS AND SYSTEMS FOR SELECTIVELY PLAYING RECEIVED RINGTONES

BACKGROUND

Users enjoy having the ability to send ringtones with their phone calls. The ringtone may be a traditional type of tone, a segment from a song, a song recorded by the sender, or some other audio and/or video file. While this is enjoyable for users, the conventional usage of such ringtones has some drawbacks: For example, when the user is in a crowded place and a cell phone rings, the user may not recognize the ringtone and therefore may not know their phone is ringing. Another drawback is that the ringtone may prove to be embarrassing under some circumstances to the user, especially if the ringtone is unusual in some way and is heard in a crowded place, business meeting, etc.

Accordingly, there exists a need for methods, systems, and computer program products for selectively playing received ringtones.

SUMMARY

In aspects of the subject matter disclosed herein, methods and systems are described for selectively playing received ringtones. Receipt at a communication device of an incoming voice call that includes a ringtone is detected. A ringtone preselected for the communication device is played in response to receiving the incoming call. Prior to receiving input for answering the call at the communication device, user input for one of playing and not playing the received ringtone at the communication device is received. The received ringtone is played or not played based on the received user input.

BRIEF DESCRIPTION OF THE DRAWINGS

Objects and advantages of the present invention will become apparent to those skilled in the art upon reading this description in conjunction with the accompanying drawings, in which like reference numerals have been used to designate like or analogous elements, and in which.

DETAILED DESCRIPTION

Figure 1:
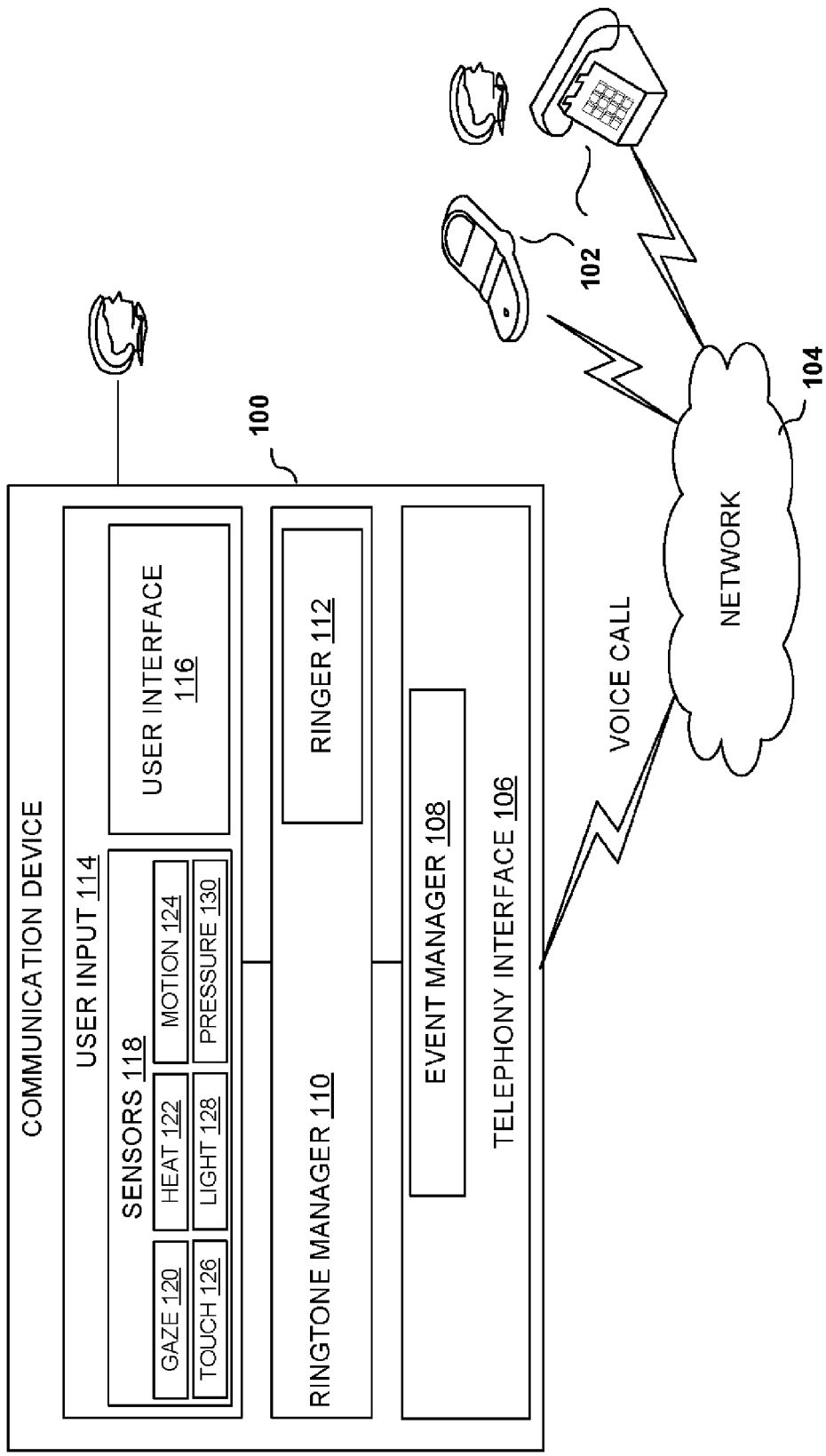
FIG. 1 is a block diagram illustrating a system for selectively playing received ringtones according to an exemplary embodiment of the subject matter described herein.
Figure 2:
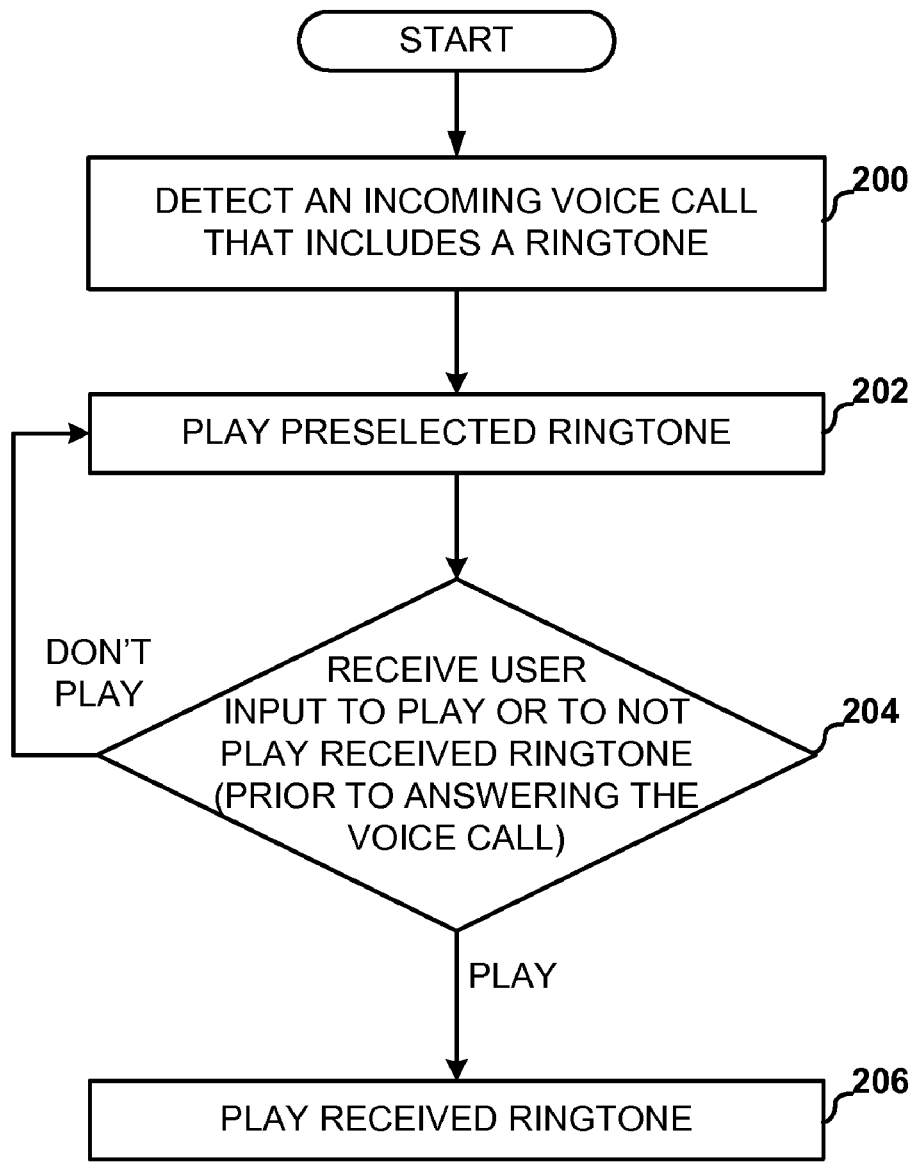
FIG. 2 is a flow diagram illustrating a method for selectively playing received ringtones according to another exemplary embodiment of the subject matter described herein.

FIG. 1 is a block diagram illustrating a system for selectively playing received ringtones according to an exemplary embodiment of the subject matter described herein. FIG. 2 is a flow diagram illustrating a method for selectively playing received ringtones according to another exemplary embodiment of the subject matter described herein. The method illustrated in FIG. 2 can be carried out by, for example, the exemplary system illustrated in FIG. 1.

In FIG. 1, communication devices 100 and 102 can communicate via one or more networks 104. The networks 104 can include conventional public switched telephone networks (PSTN), packet switched networks, cellular networks, and the like, and are configured for enabling wired or wireless communication devices 102 to initiate voice calls to a wired or wireless communication device 100. As used herein, voice calls are calls initiated at one communication device 102 via input received by the user interface of the communication device and placed to another communication device 100. The calls can include voice, data, audio, video, and the like. As used herein, a communication device is any device that enables two or more users to communicate with each other in some manner, and can include a cellular phone, a voice over Internet protocol (VoIP) phone, a camera phone, a network-ready camera, a personal digital assistant (PDA), a computer, and the like.

With reference to FIG. 2, in block 200 receipt of an incoming voice call that includes a ringtone is detected at communication device 100. Accordingly, a system for selectively playing received ringtones includes means for detecting receipt at a communication device of an incoming voice call that includes a ringtone. For example, as illustrated in FIG. 1, communication device 100 includes a telephony interface component 106 configured for detecting receipt of an incoming voice call that includes a ringtone. The telephony interface component 106 interfaces to one or more networks 104 for sending and receiving voice calls and other types of communications. The telephony interface component 106 includes an event manager 108 that receives voice calls and other communication events that are sent to it from other communication devices. In the case of a cellular phone, an incoming event may be a call, a short messaging system (SMS) message, a call with a specialized ringtone, an alert, and the like. The event manager 108 receives these various communication events via one or more networks 104 and initiates other components in communication device 100 to act according to the type of communication event. For example, in the case of a phone call, and depending on predefined settings, a ringtone manager 110 may be activated to alert a user of the call via a ringer 112, the call may be forwarded to voicemail, or other functions may be initiated and performed at communication device 100.

An incoming voice call may have a ringtone associated with it in several different ways. According to one aspect, telephony interface component 106 can be configured for detecting and receiving a ringtone provided to communication device 100 in data received in connection with the voice call. For example, the ringtone may be sent to the device as a part of the call. The call can prompt the sending of a message containing the ringtone or can include the ringtone. The message could be received at the telephony interface component 106 with the call or shortly before or after the call, but the ringtone is received in connection with the call.

According to another aspect, telephony interface component 106 can be configured for detecting a ringtone identifier in data received in connection with the voice call and retrieving the identified ringtone. For example, the ringtone may be identified to the device as a part of the call. The call can prompt the sending of a message containing the ringtone identifier or can include the ringtone identifier. The message could be received at the telephony interface component 106 with the call or shortly before or after the call, but the ringtone identifier is received in connection with the call. The telephony interface component 106 uses the identifier to retrieve the ringtone from the ringtone manager component 110 or from an external source (not shown) that is reachable by the telephony interface component 106 via the one or more networks 104. The ringtone may be resident, for example in a memory associated with ringtone manager component 110.

Accordingly, a received ringtone may be received synchronously with the voice call or may be received or retrieved before or after the voice call but is identified as being associated with the call. The ringtone may be received or retrieved via a different communication mechanism, such as Bluetooth or WiFi, than a mechanism for receiving the voice call, such as via a cellular network. Nevertheless, the call and the associated ringtone are associated. Thus, when a call comes in, the communication device is able to identify the associated ringtone.

Returning to FIG. 2, in block 202 a ringtone preselected for the communication device is played in response to receiving the incoming call. Accordingly, a system for selectively playing received ringtones includes means for playing a ringtone preselected for the communication device in response to receiving the incoming call. For example, as illustrated in FIG. 1, ringtone manager component 110 is configured for playing a preselected ringtone in response to receiving the incoming call. When the incoming call is received, the event manager 108 of the telephony interface component 106 typically initiates ringtone manager component 110, which retrieves a preselected ringtone and provides for ringer 112 to play the preselected ringtone. In one aspect, a preselected ringtone can be a ringtone that a user has previously selected for association with a voice call for playing when a voice call is received. A user may select from a variety of ringtones stored in the communication device or available for download to the communication device and may associate the preselected ringtone with a single user, with multiple users, with a class of users, or with all received voice calls in general.

In another aspect, the preselected ringtone can be set in communication device 100 prior to purchase by the user, such as by the manufacturer or retailer. In any case, a preselected ringtone is played by the ringer 112 when a voice call is received. The ringer 112 is configured for playing simple tones based on changing an oscillator frequency, synthesizer based instrumental music and sounds (e.g., MIDI files), or short clips of music recordings (real music, true tones, MP3, WMA, and the like), and can include vibrators and other hardware components that identify an incoming call event to the user.

Returning to FIG. 2, in block 204 prior to receiving input for answering the call at the communication device, receiving user input for one of playing and not playing the received ringtone at the communication device. Accordingly, a system for selectively playing received ringtones includes means for receiving user input for one of playing and not playing the received ringtone at the communication device prior to receiving input for answering the call at the communication device. For example, as illustrated in FIG. 1, a user input component 114 is configured for receiving user input for one of playing and not playing the received ringtone at the communication device. The ringtone manager component receives user input from user input component 114. In one aspect, the received user input can provide an indication that the user is ready to play the received ringtone. In another aspect, the received user input can provide an indication that the user does not want to play the received ringtone. For example, when the user is in an area where it would be inappropriate to play the received ringtone (e.g., church, library, school, etc.), the user may provide input to not play the received ringtone.

In one aspect, user input component 114 can include a user interface 116 and user input component 114 is configured for receiving user input via the user interface 116. The user interface may include input from, for example, hard buttons, soft buttons, microphone, mouse clicks, mouse gestures, hand gestures, and the like. The input may be in the form of detecting, for example, a user pressing a "no" button, a user saying "no" into a microphone, and other such input known in the art.

In another aspect, the user input component 114 can include one or more sensors 118, such as a gaze detector 120, a heat sensor 122, a motion sensor 124, a touch sensor 126, a light sensor 128, a pressure sensor 130, and the like. Each of these sensors 118 can provide information that may be used for determining whether the received ringtone should be played based on, for example, the user's attention to communication device 100. A user may predefine the semantics of a sensor input or the correspondence may be predefined by default. For example, the sensing of picking up communication device 100 may be identified as an input to play the received ringtone while no interaction with communication device 100 may be identified as input to not play the received ringtone. Valid inputs can be stored within the ringtone manager 110.

Accordingly, in one aspect, the user input component 114 can include a gaze detector 120 configured for detecting whether a user is looking at communication device 100 and the user input component 114 is configured for receiving user input via the gaze detector. For example, the input of a user looking at communication device 100 can indicate a user input for playing the received ringtone.

In another aspect, the user input component 114 can include one or more of a heat sensor 122, a touch sensor 126, a light sensor 128, and a pressure sensor 130 configured for detecting whether a user is holding communication device 100 and the user input component is configured for receiving user input via one or more of these sensors. For example, heat sensor 122, touch sensor 126, light sensor 128, and pressure sensor 130, alone or in combination can detect a user holding communication device 100. Heat sensor 122 can be configured to sense that communication device 100 has been exposed to a temperature that is close to the temperature of the human body, indicating it is being held by the user. Touch sensor 126 can be configured to sense that communication device 100 has been touched by sensing, for example, capacitance applied by a human body, indicating it is being held by the user. Light sensor 128 can be configured to sense that communication device 100 has been exposed to lighter conditions in a short time after being picked up by a user from a pocket, holster, pocket book, etc., indicating it is being held by the user. Pressure sensor 130 can be configured to sense that communication device 100 has been pressed by sensing, for example, pressure on the casing or on a specific region or button, indicating it is being held by the user.

In another aspect, the user input component includes a motion sensor 124 configured for detecting whether a user is moving communication device 100 and the user input component is configured for receiving user input via the motion sensor 124. Motion sensor 130 can be configured to sense that communication device 100 has been moved by employing, for example, one or more accelerometers that detect movements and accelerations, indicating communication device 100 is being moved by the user.

In any case, the input from the sensors 118 is provided to the ringtone manager, which determines if the received input is valid or not. The input from the sensors 118 and/or the user interface 116 is forwarded to the ringtone manager component 120. If the user input indicates a user preference for playing the received ringtone, then the ringtone manager component 120 plays the ringtone. If the user input indicates a user preference for not playing the ringtone, then the ringtone manager does not play the ringtone.

In another aspect, the received user input can include a selection to play the received ringtone according to specified constraints for playing the received ringtone. For example, the specified constraints can define a delay for playing the received ringtone. In example, the user may specify that the received ringtone be played after a particular amount of time or only if he has been holding the phone for a period of time.

In another aspect, the specified constraints can be predefined and are different for different senders of the ringtone. The user may specify constraints for playing received ringtones based on the sender of the ringtone. For example, a user may specify that ringtones received from his spouse be played after an input of accepting to play the ringtone, whereas a ringtone received from his boss is played after the input of holding the phone and looking at it.

In any case, the constraints may be prespecified by the user for all or some received ringtones.

Returning to FIG. 2, in block 206 the received ringtone is played, or the received ringtone is not played and control returns to block 202, based on the received user input. Accordingly, a system for selectively playing received ringtones includes means for playing or not playing the received ringtone based on the received user input. For example, as illustrated in FIG. 1, the ringtone manager component 110 is configured to play or not play the received ringtone based on user input received from user input component 114.

Once the ringtone manager component 110 receives input from the user input component 114, the communication device transitions from playing the preselected ringtone to the received ringtone if the user input was to play the received ringtone. If the user input was to not play the received ringtone, then the ringtone manager component 110 does not play the received ringtone and continues to play the preselected ringtone. The transition from playing the preselected ringtone to playing the received ringtone is done prior to receiving input from the user to answer the call, for example by accepting or rejecting the call. The ringer 112 receives the received ringtone from the ringtone manager component 110 and initiates the playing of the ringtone, which can include initiating other components or plug-ins for playing it. For example, a real player may be activated to play a particular song received.

It should be understood that the various components illustrated in the various block diagrams represent logical components that are configured to perform the functionality described herein and may be implemented in software, hardware, or a combination of the two. Moreover, some or all of these logical components may be combined, some may be omitted altogether, and additional components can be added while still achieving the functionality described herein. Thus, the subject matter described herein can be embodied in many different variations, and all such variations are contemplated to be within the scope of what is claimed.

To facilitate an understanding of the subject matter described above, many aspects are described in terms of sequences of actions that can be performed by elements of a computer system. For example, it will be recognized that the various actions can be performed by specialized circuits or circuitry (e.g., discrete logic gates interconnected to perform a specialized function), by program instructions being executed by one or more processors, or by a combination of both.

Moreover, executable instructions of a computer program for carrying out the methods described herein can be embodied in any machine or computer readable medium for use by or in connection with an instruction execution machine, system, apparatus, or device, such as a computer-based or processor-containing machine, system, apparatus, or device, that can read or fetch the instructions from the machine or computer readable medium and execute the instructions.

As used here, a "computer readable medium" can be any means that can contain, store, communicate, propagate, or transport the computer program for use by or in connection with the instruction execution machine, system, apparatus, or device. The computer readable medium can be, for example, but not limited to, an electronic, magnetic, optical, electromagnetic, infrared, or semiconductor machine, system, apparatus, or device. More specific examples (a non-exhaustive list) of the computer readable medium can include the following: a portable computer diskette, a random access memory (RAM), a read only memory (ROM), an erasable programmable read only memory (EPROM or Flash memory), a portable compact disc (CD), a portable digital video disc (DVD), and the like.

Thus, the subject matter described herein can be embodied in many different forms, and all such forms are contemplated to be within the scope of what is claimed. It will be understood that various details of the invention may be changed without departing from the scope of the claimed subject matter. Furthermore, the foregoing description is for the purpose of illustration only, and not for the purpose of limitation, as the scope of protection sought is defined by the claims as set forth hereinafter together with any equivalents thereof entitled to.

What is claimed is:

1. A method for selectively playing received ringtones, the method comprising:
    detecting receipt at a communication device of an incoming voice call that includes a ringtone;
    playing a ringtone preselected for the communication device in response to receiving the incoming call;
    prior to receiving input for answering the call at the communication device, receiving user input for one of playing and not playing the received ringtone at the communication device; and
    playing or not playing the received ringtone based on the received user input.

2. The method of claim 1 wherein detecting receipt of a ringtone includes detecting a ringtone provided to the communication device in data received in connection with the voice call.

3. The method of claim 1 wherein detecting receipt of a ringtone includes detecting a ringtone identifier in data received in connection with the voice call and retrieving the identified ringtone.

4. The method of claim 1 wherein receiving user input includes receiving input for detecting whether a user is looking at the communication device.

5. The method of claim 1 wherein receiving user input includes receiving input for detecting whether a user is holding the communication device.

6. The method of claim 1 wherein receiving user input includes receiving input for detecting whether a user is moving the communication device.

7. The method of claim 1 wherein receiving user input includes receiving input from a user interface of the communication device.

8. The method of claim 1 wherein the received user input includes a selection to play the received ringtone according to specified constraints for playing the received ringtone.

9. The method of claim 8 wherein the specified constraints are predefined and are different for different senders of the ringtone.

10. The method of claim 8 wherein the specified constraints define a delay for playing the received ringtone.

11. A system for selectively playing received ringtones, comprising:
    means for detecting receipt at a communication device of an incoming voice call that includes a ringtone;

means for prior to receiving input for answering the call at the communication device, receiving user input for one of playing and not playing the received ringtone at the communication device; and means for playing a ringtone preselected for the communication device in response to receiving the incoming call and for playing or not playing the received ringtone based on the received user input.

12. A system for selectively playing received ringtones, comprising:
   a telephony interface component configured for detecting receipt at a communication device of an incoming voice call that includes a ringtone;
   a user input component configured for, prior to receiving input for answering the call at the communication device, receiving user input for one of playing and not playing the received ringtone at the communication device; and
   a ringtone manager component configured for playing a ringtone preselected for the communication device in response to receiving the incoming call and for playing or not playing the received ringtone based on the received user input.

13. The system of claim 12 wherein the telephony interface component is configured for detecting and receiving a ringtone provided to the communication device in data received in connection with the voice call.

14. The system of claim 12 wherein the telephony interface component is configured for detecting a ringtone identifier in data received in connection with the voice call and retrieving the identified ringtone.

15. The system of claim 12 wherein the user input component includes a gaze detector configured for detecting whether a user is looking at the communication device and the user input component is configured for receiving user input via the gaze detector.

16. The system of claim 12 wherein the user input component includes one of a heat sensor, a touch sensor, a pressure sensor, and a light sensor configured for detecting whether a user is holding the communication device and the user input component is configured for receiving user input via the one of the heat sensor, the touch sensor, the pressure sensor, and the light sensor.

17. The system of claim 12 wherein the user input component includes a motion sensor configured for detecting whether a user is moving the communication device and the user input component is configured for receiving user input via the motion sensor.

18. The system of claim 12 wherein the user input component includes a user interface and the user input component is configured for receiving user input via the user interface.

19. The system of claim 12 wherein the received user input includes a selection to play the received ringtone according to specified constraints for playing the received ringtone.

20. The system of claim 19 wherein the specified constraints are predefined and are different for different senders of the ringtone.

21. The system of claim 19 wherein the specified constraints define a delay for playing the received ringtone.

22. A computer readable medium including a computer program, executable by a machine, for selectively playing received ringtones, the computer program comprising executable instructions for:
   detecting receipt at a communication device of an incoming voice call that includes a ringtone;
   playing a ringtone preselected for the communication device in response to receiving the incoming call;
   prior to receiving input for answering the call at the communication device, receiving user input for one of playing and not playing the received ringtone at the communication device; and
   playing or not playing the received ringtone based on the received user input.

* * * * *